United States Patent [19]

Murakami

[11] Patent Number: 4,874,144
[45] Date of Patent: Oct. 17, 1989

[54] BAIL FOR SPINNING REEL

[75] Inventor: Hideo Murakami, Hiroshima, Japan

[73] Assignee: Ryobi, Ltd., Hiroshima, Japan

[21] Appl. No.: 98,957

[22] Filed: Sep. 21, 1987

[30] Foreign Application Priority Data

Sep. 22, 1986 [JP] Japan ................................ 61-1453[U]

[51] Int. Cl.$^4$ ............................................. A01K 89/01
[52] U.S. Cl. .................................... 242/235; 428/35.8
[58] Field of Search ...................... 242/84.2 G, 84.2 R, 242/84.2 C; 16/126, 127, DIG. 18; 220/94 R, 95; 428/36

[56] References Cited

U.S. PATENT DOCUMENTS

| 226,794 | 4/1980 | Schwerin | 16/126 |
| 2,595,695 | 5/1952 | Packer | 16/126 X |
| 3,846,902 | 11/1974 | Sebring | 220/94 R X |
| 4,171,108 | 10/1979 | Ishida | 242/84.2 G |
| 4,287,678 | 9/1981 | Yamamoto | 242/157 R |

FOREIGN PATENT DOCUMENTS

| 1057668 | 3/1954 | France | 242/157 C |
| 1096590 | 6/1955 | France . | |
| 1452862 | 9/1966 | France . | |

Primary Examiner—Stuart S. Levy
Assistant Examiner—Katherine Matecki
Attorney, Agent, or Firm—Finnegan, Henderson, Farabow, Garrett & Dunner

[57] ABSTRACT

A bail of light weight construction for a spinning reel, including a metal tube having an internal opening extending therethrough and being partially or entirely filled with a synthetic resin.

4 Claims, 3 Drawing Sheets

BAIL FOR SPINNING REEL

BACKGROUND OF THE INVENTION

The present invention relates to a bail of a spinning reel for fishing.

As shown in FIGS. 3 and 4, the rotor 8 of a conventional spinning reel for fishing is rotatably supported in a fixed position by the body 9 of the reel, while the spool 7 of the reel is supported for backward and forward movement. A bail 11 is attached by bail cams (not shown) and bail levers (not shown) to arms 10 and 10' which are symmetrically provided on the peripheral portion of the rotor, so that the bail can be swung up and down. When fishline (not shown) wound on the spool 7 is unwound, the bail 11 remains swung down as shown by a two-dot chain line in FIG. 3. When fishline is wound on the spool 7, the bail 11 remains swung up as shown by a full line in FIG. 3. When the rotor 8 is rotated to wind the fishline on the spool 7, the bail 11 is rotated together with the rotor. The bail remains protruded outward in a direction from the center of the rotation of the rotor.

Since the conventional bail 11 is made of a relatively-heavy solid wire of stainless steel, duralumin, titanium, or the like, the utilization of the conventional bail limits weight reduction of the spinning reel. Moreover, since the weight of the assembly of the rotor 8 and the bail 11 is nonuniformly distributed, it is very difficult to establish the proper rotative balance of the assembly.

SUMMARY OF THE INVENTION

Accordingly, it is an object of the present invention to provide a bail that is light in weight.

Another object of the present invention is to provide a bail that makes it easier to establish the rotative balance of the assembly of the bail and a rotor.

These and other objects are accomplished by a bail for a spinning reel comprising a metal tube having an internal opening extending therethrough and including synthetic resin in the opening at selected locations to reinforce predetermined locations of the bail.

BRIEF DESCRIPTION OF THE DRAWINGS

The manner by which the above and other objects are achieved will become fully apparent from the following detailed description when it is considered in view of the drawings, wherein.

DETAILED DESCRIPTION OF THE PREFERRED EMBODIMENT

Figure 1:
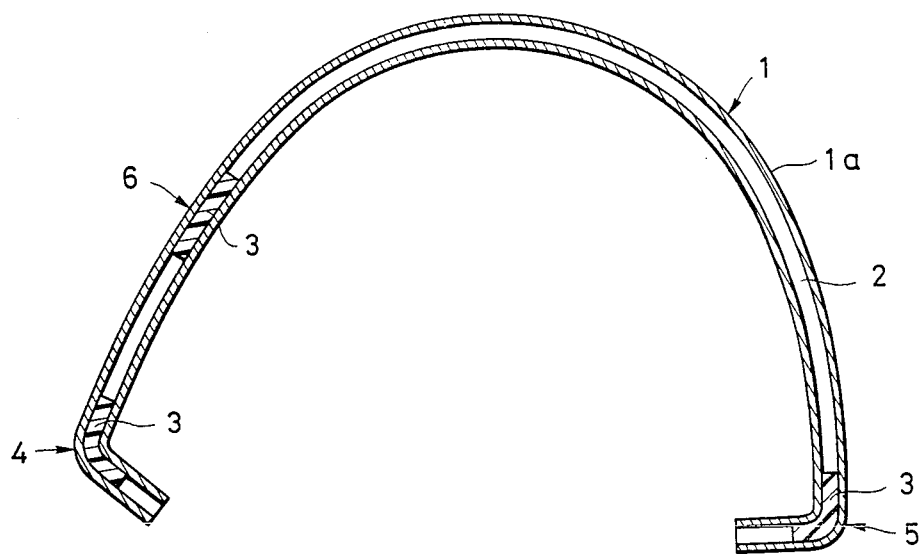
FIG. 1 shows a longitudinally-sectional forward view of an embodiment of the present invention.
Figure 2:
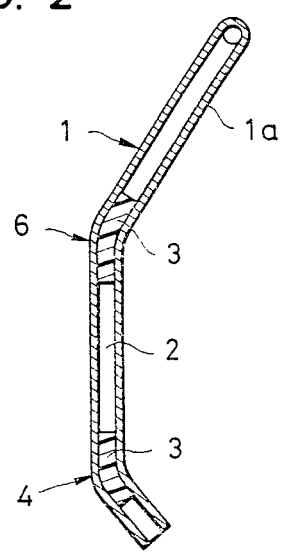
FIG. 2 shows a longitudinally-sectional side view of the present invention.
Figure 3:
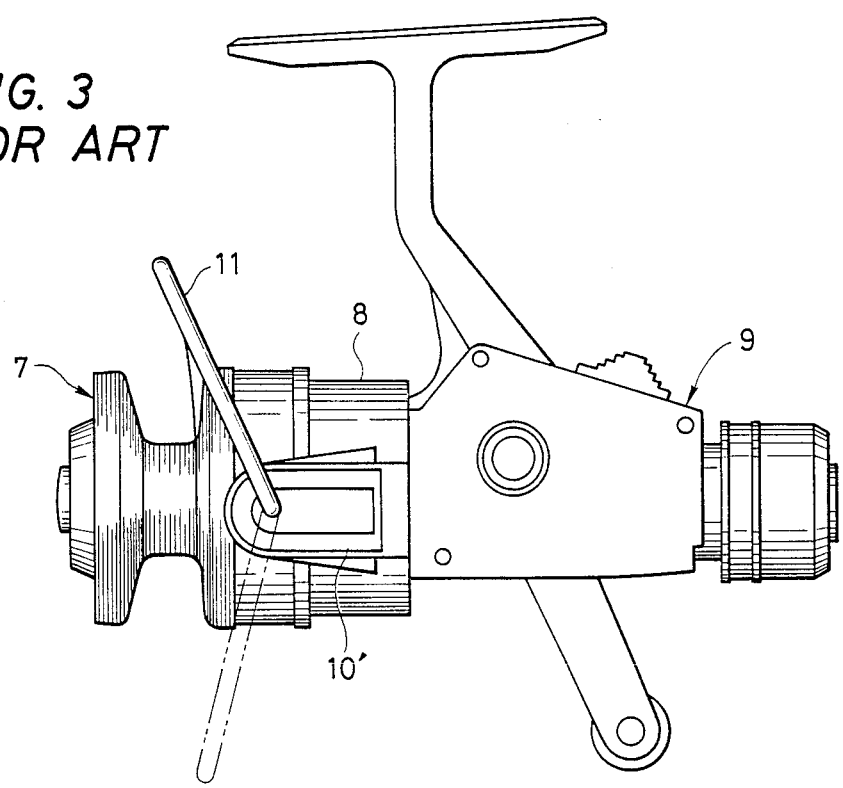
FIG. 3 shows a side view of a conventional spinning reel.
Figure 4:
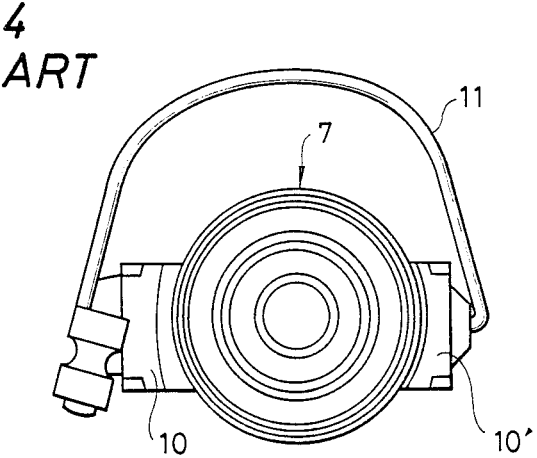
FIG. 4 shows a front view of the conventional spinning reel.
Figure 5:
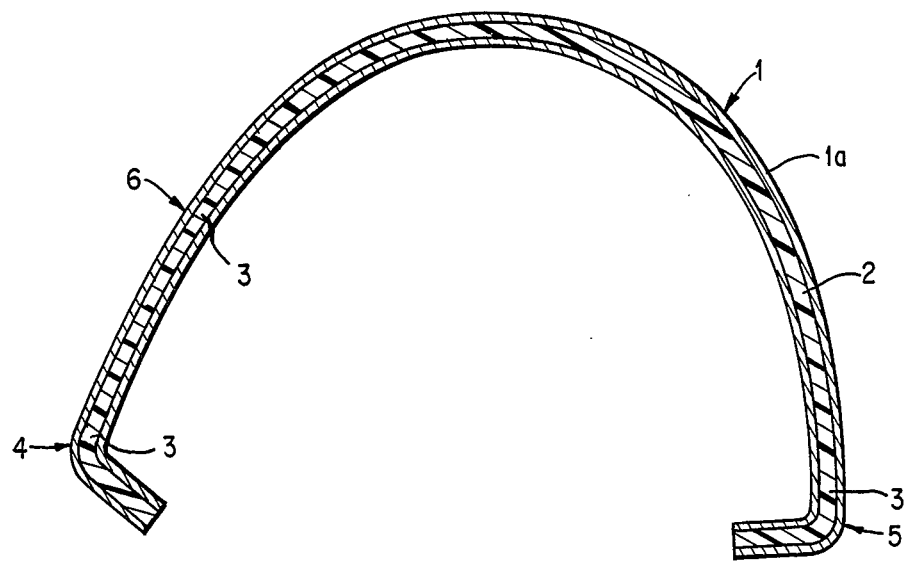
FIG. 5 shows a longitudinally-sectional forward view of an alternate embodiment of the present invention.
Figure 6:
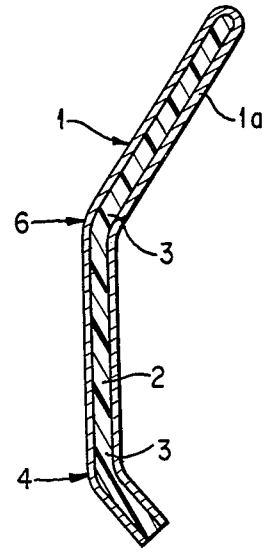
FIG. 6 shows a longitudinally-sectional side view of the present invention.

An embodiment of the present invention is hereafter described in detail with reference to FIGS. 1 and 2. The bail 1 is made of a metal tube 1a of aluminum, duralumin, stainless steel, or the like, which is bent and curved to a desired form as shown in FIGS. 1, 2, 5 and 6. The internal opening 2 of the bail 1 is partially (see FIGS. 1 and 2) or entirely (see FIGS. 5 and 6) filled with a synthetic resin 3.

When the internal opening 2 of the bail 1 is partially filled with the synthetic resin 3, the internal openings of the bent end portions 4 and 5 and curved portion 6 or the like of the bail, which are attached to bail cams (not shown) and bail levers (not shown) and other locations that are required to have a sufficient strength, are filled with the synthetic resin. As a result, the bent end portions 4 and 5 and curved portion 6, or the like of the bail 1 are highly resistant to being improperly deformed at the time of shaping thereof, and are reinforced.

The internal opening 2 of the bail 1 may be filled with the synthetic resin 3 when the resin is molten and poured into the whole internal opening or into the to-be-bent and to-be-curved portions thereof by an injection molding machine or the like before the bending and curving of the bail. The bail is then bent and curved to the prescribed form before the complete solidification of the poured resin. In another method of filling the internal opening 2 of the bail 1 with the synthetic resin 3, a thermoplastic resin is solidified as the synthetic resin in the to-be-bent and to-be-curved portions of the internal opening 2 of the metal tube 1a. The portions are thereafter heated by an appropriate means to soften the thermoplastic resin, and the metal tube is then bent and curved to the desired form.

Since the bail of the present invention is made as a light weight metal tube, the nonuniformity of the distribution of the weight of the assembly of the rotor and the bail is reduced thereby facilitating the establishment of the rotative balance of the assembly. Additionally, the weight of a spinning reel including the bail is reduced. Since the internal opening of the bail is partially or entirely filled with the synthetic resin in order to reinforce the bail and prevent the bent and curved portions thereof from being deformed, the bail may have a desired cross-sectional form and a desired shape, and yet maintain sufficient strength.

It will be apparent to those of ordinary skill in the art that various modifications and variations can be made to the aforementioned embodiment without departing from the scope of the appended claims and their equivalents.

What is claimed is:

1. A fishing reel bail assembly for mounting on a rotor of a fishing reel, comprising a hollow arcuate metallic tube having first and second ends, means including the first and second ends for attachment to bail support arms of the fishing reel rotor, and synthetic resin disposed at a plurality of predetermined locations within the tube between the first and second ends for reinforcing said tube.

2. The fishing reel bail assembly of claim 1, wherein said metallic tube is selected from the group consisting of aluminum, duralumin and stainless steel.

3. The fishing reel bail assembly of claim 1, wherein said plurality of predetermined locations within the tube include portions of said tube which are bent and curved to form said arcuate shape.

4. The fishing reel rotor bail assembly of claim 1, wherein said predetermined locations include the entire length of the metallic tube between said first and second ends.

* * * * *